United States Patent [19]
Soares

[11] Patent Number: 6,089,824
[45] Date of Patent: Jul. 18, 2000

[54] INTRODUCED IN PROTECTION ELEMENT AGAINST BIRD INGESTION INTO AIRCRAFT TURBINES

[76] Inventor: Eduardo Alves Tinoco Soares, Rua Marechal Bina Machado, 511, São Paulo, SP, Brazil

[21] Appl. No.: 09/110,601

[22] Filed: Jul. 6, 1998

[30] Foreign Application Priority Data

Apr. 7, 1997 [BR] Brazil ................................ 9702572

[51] Int. Cl.$^7$ .................................................. F01D 5/12
[52] U.S. Cl. .................................. 415/121.1; 415/121.2; 60/39.092
[58] Field of Search .............................. 415/121.1, 121.2, 415/169.1; 416/247 R; 60/39.092; 55/306; 244/53 B, 121; 239/288

[56] References Cited

U.S. PATENT DOCUMENTS

| 3,121,545 | 2/1964 | Meletiou | 60/39.092 |
| 3,196,598 | 7/1965 | Olson | 415/121.2 |
| 3,302,395 | 2/1967 | Robbins | 60/39.092 |

FOREIGN PATENT DOCUMENTS

| 9603367 | 7/1997 | Brazil . | |
| 2344445 | 10/1977 | France | 415/121.2 |
| 2603946 | 3/1988 | France | 60/39.092 |
| 2213352 | 9/1973 | Germany | 244/53 B |
| 2214873 | 10/1973 | Germany | 244/53 B |
| 61-277826 | 12/1986 | Japan | 60/39.092 |

*Primary Examiner*—Christopher Verdier
*Attorney, Agent, or Firm*—Gottlieb Rackman & Reisman PC

[57] ABSTRACT

An apparatus for preventing foreign objects from entering the air intakes of turbine engines is disclosed. A shaft is fixed to the centerhub of a turbine engine with a conical piece attached at the other end of the shaft. The conical piece has a number of spires on its outer surface so that as it spins, it can reduce any foreign objects which may enter the air intake into small and harmless pieces.

10 Claims, 3 Drawing Sheets

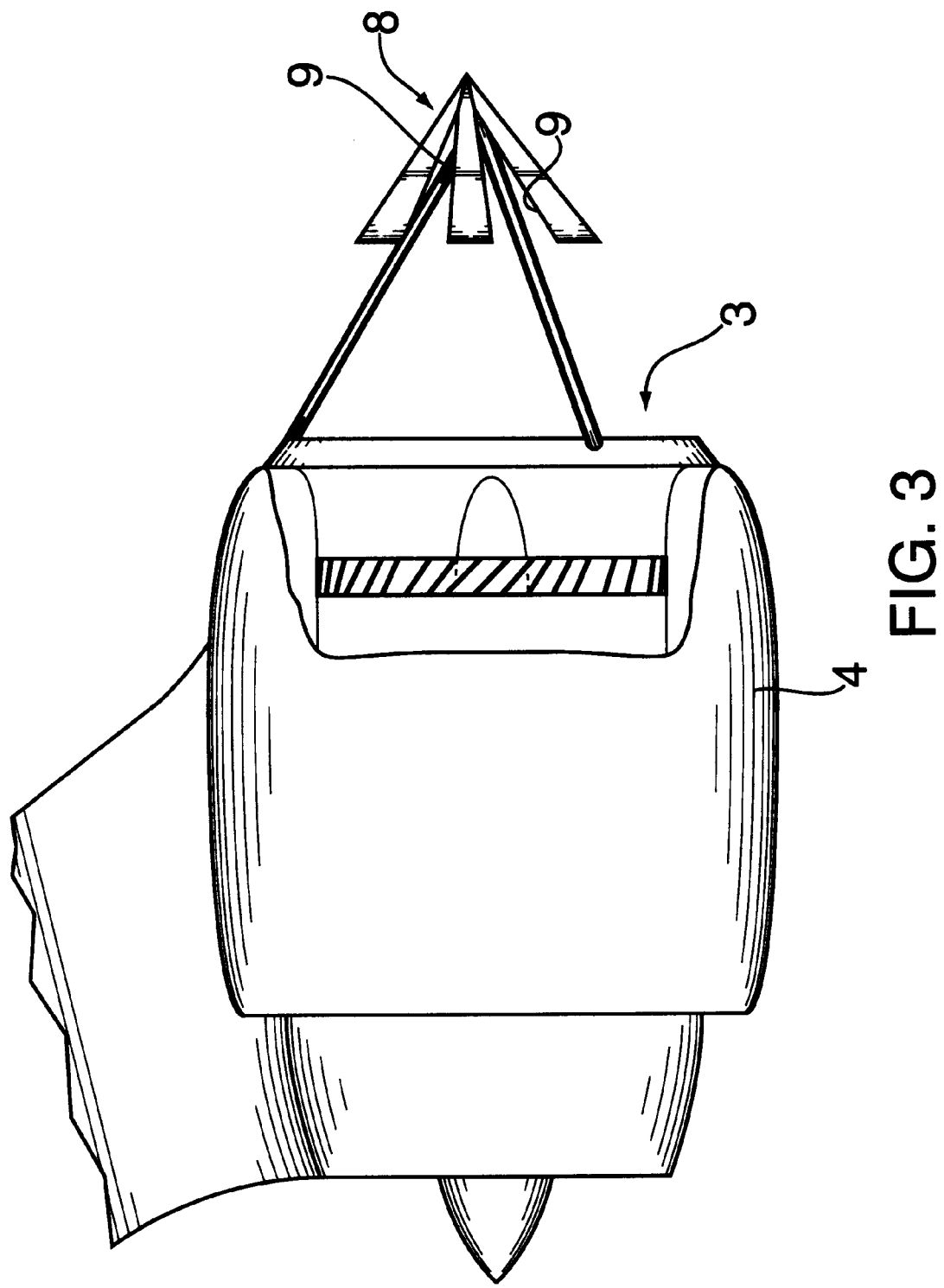

INTRODUCED IN PROTECTION ELEMENT AGAINST BIRD INGESTION INTO AIRCRAFT TURBINES

FIELD OF THE INVENTION

This invention relates to aircraft turbine engines and more particularly to protection systems to guard against objects entering the engine at its air intake.

BACKGROUND OF THE INVENTION

Aircraft turbine engines are particularly susceptible to damage from birds introduced into the air intake stream of the gas turbine. An ingested bird can rupture, distort and damage blades and other component parts of the engine. When this occurs, the desired balance condition of the compressor is often disrupted and the probable useful life of the engine is shortened if not completely destroyed.

Aircraft turbine engines have therefore been commonly provided heretofore with air inlet covers, such as screens and the like to prevent ingestion of sizable foreign objects. Screens, however, have been found to produce a safety hazard when ice forms over the screen. They also generally impair the efficiency of the engine by interfering with normal air flow through the engine and frequently these screens break up with disastrous results to the engine. In addition, none of the prior art systems provide a means to break up a foreign object into smaller, harmless pieces.

Therefore, it is desirable to provide protection apparatus for an aircraft turbine engine that does not interfere with the air flow to the intakes while providing a means to reduce large birds and other foreign objects into smaller harmless pieces.

SUMMARY OF THE INVENTION

In accordance with the principles of the present invention, there is provided an apparatus for protecting the air intake of a turbine engine from the ingestion of birds and other foreign objects. A tubular shaft is fixed to the centerhub of a turbine with a conical piece on its end. The cone has spires on its outer surface, like that of a screw. The cone is spun by the turbine via the shaft creating an obstacle and preventing foreign objects from entering the air intake of said turbine engine.

BRIEF DESCRIPTION OF THE DRAWINGS

The following description can be better understood in conjunction with the drawings in which:

FIG. 3 shows another variation of the embodiment shown in FIGS. 1 and 2.

DETAILED DESCRIPTION OF THE PREFERRED EMBODIMENT

Figure 1:
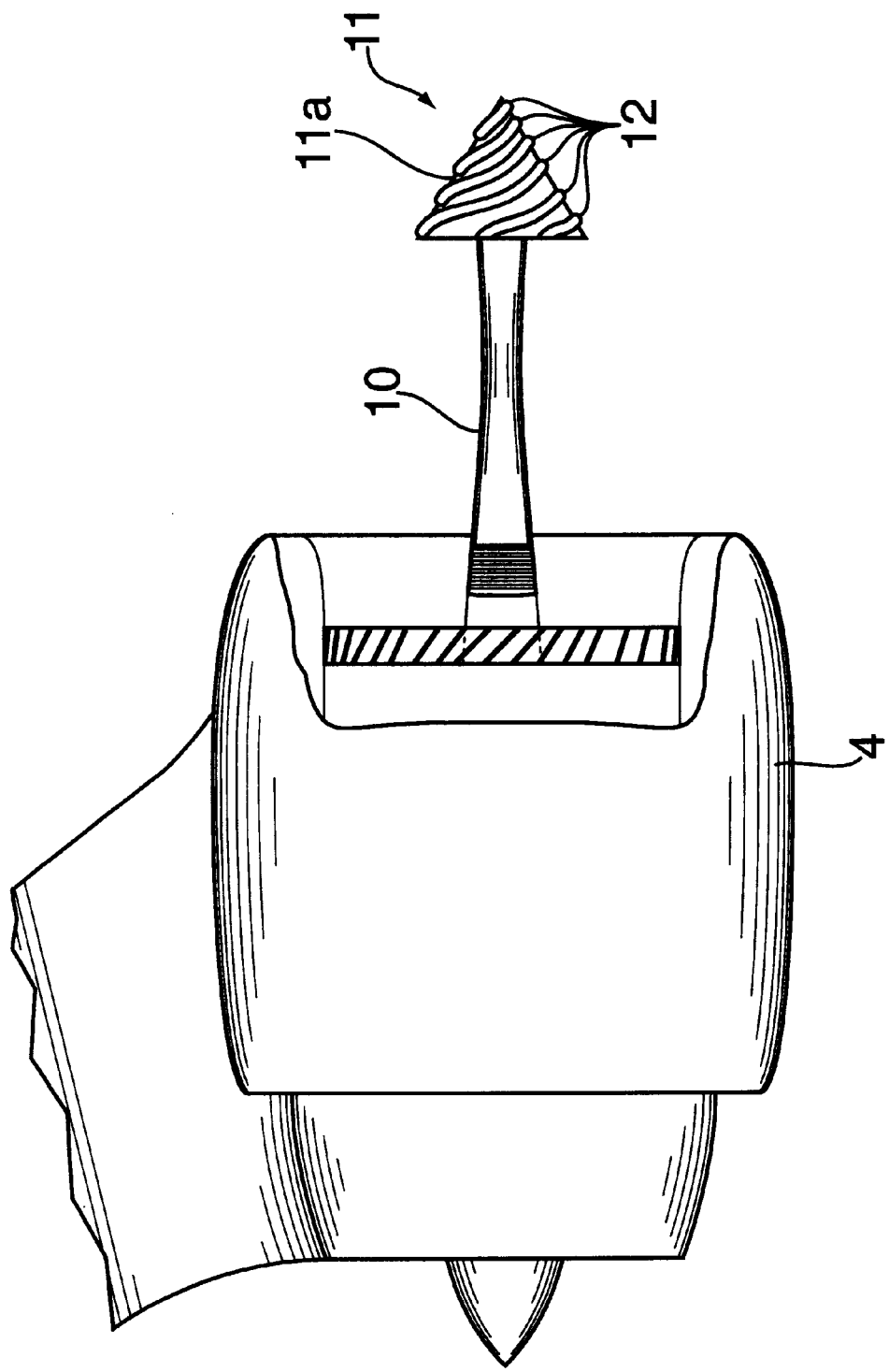
FIG. 1 depicts a turbine engine fitted with the apparatus of the present invention; and, FIG. 2 depicts an alternative embodiment of the apparatus of FIG. 1 with an axially mobile protection piece.

Referring to FIG. 1, there is shown a turbine fitted with the protection apparatus of the present invention. A turbine engine 14 has a tubular shaft 10 attached to its center so that the shaft 10 rotates at the same speed as the turbine 14. A cone 11 is attached to the free end of the shaft 10. The cone 11 has a series of spires 12 on its outside in a screw-like formation.

The cone 11 spins with the turbine 4 to prevent a foreign object, such as a bird, from entering the turbine engine. The spires 12 on the cone 11 will act as a grinder in the event of a collision with a bird and reduce the bird to small, harmless pieces so that the turbine is not damaged.

Figure 2:
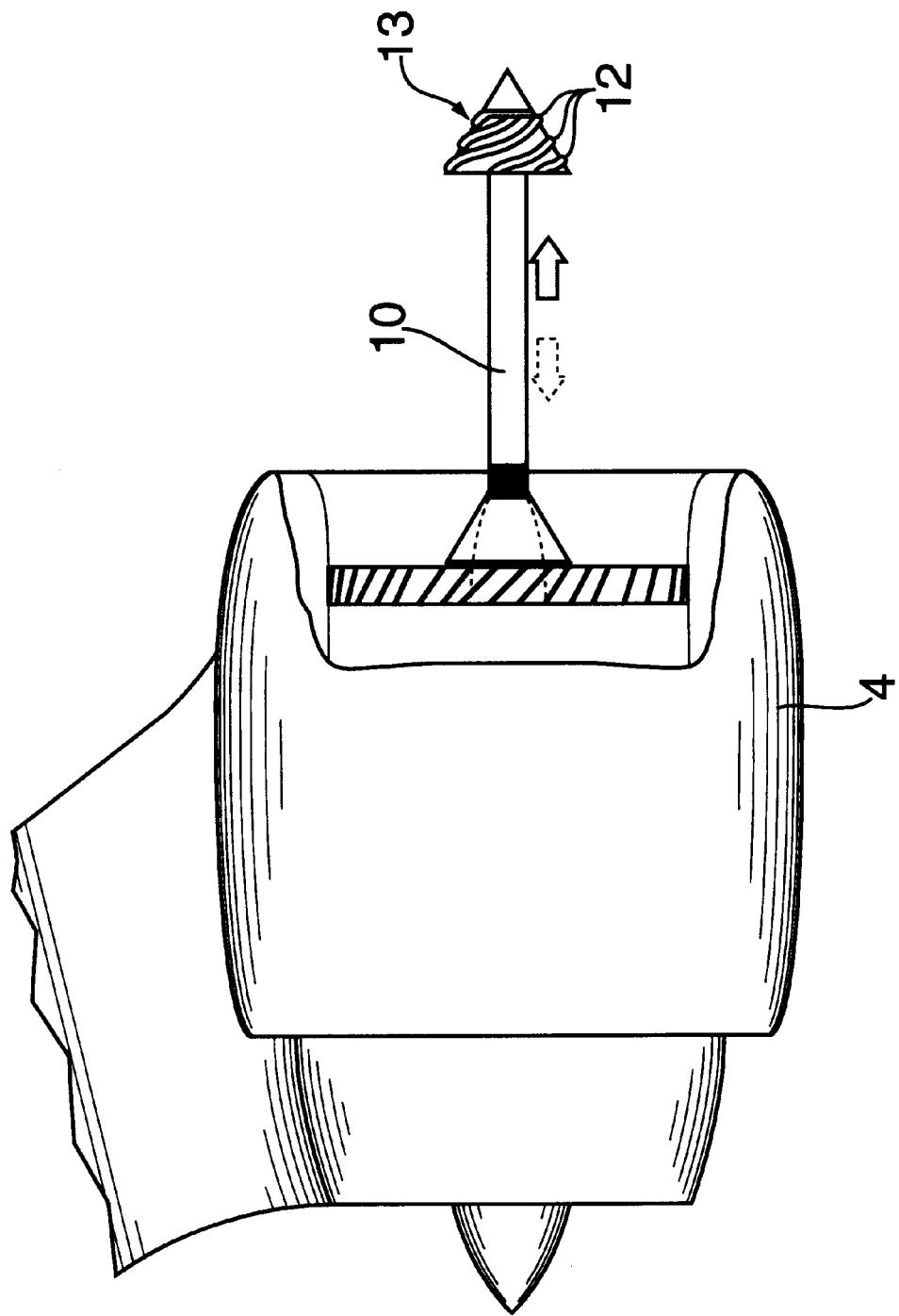

FIG. 2 shows an alternative embodiment of the present invention where the shaft 10 moves in an axial direction 20 to move the deviating cone 13 back and forth. The means for moving the cone 13 may be hydraulic, pneumatic, electrical or mechanical. The cone 13 can be folded 21 when it is not required or useful, say at landing or take-off. In its folded position 21, the cone 13 covers the centerhub of the turbine 14.

Referring now to FIG. 3, there is shown another alternative embodiment of the present invention. The cone 18 is made up of blades 19 to provide openings in the cone 18 for better air induction into the turbine 14.

The description disclosed in this specification is meant to illustrate a preferred embodiment and the principles of the present invention and not to limit its uses or application. It should be noted that the protection element object of the present invention may be altered both technically and in structure to match special features of any turbine engine.

What is claimed is:

1. An apparatus for protecting an air intake of a turbine engine having a centerhub comprising:

a tubular shaft having a first end and a second end, said first end being fixed to said turbine centerhub, said second end having a conical piece with an outer surface and a plurality of spires disposed on said outer surface, wherein said conical piece is rotated by said turbine via said shaft and is arranged and constructed to prevent foreign objects from entering said air intake of said turbine engine by reducing said foreign objects into small pieces.

2. The apparatus of claim 1, further comprising retracting means for retracting said shaft and said conical piece.

3. The apparatus of claim 2, wherein said conical piece is arranged and constructed to cover said turbine centerhub.

4. An apparatus for protecting an air intake of a turbine engine with a centerhub comprising:

a tubular shaft having a first end and a second end, said first end being fixed to said centerhub, said second end having a conical piece with an outer surface and a plurality of spires disposed on said outer surface; and, means for axially moving said shaft and said conical piece substantially parallel with the centerline of said turbine, wherein said conical piece is rotated by said turbine in a manner selected to reduce foreign objects into small pieces.

5. The apparatus of claim 4, further comprising retracting means for retracting said shaft and said conical piece.

6. The apparatus of claim 5, wherein said conical piece is constructed and arranged to cover said turbine center when said conical piece is retracted.

7. The apparatus of claim 4, wherein the means for axially moving said shaft and said conical piece is hydraulic.

8. The apparatus of claim 4, wherein the means for axially moving said shaft and said conical piece is pneumatic.

9. The apparatus of claim 4, wherein the means for axially moving said shaft and said conical piece is electrical.

10. The apparatus of claim 4, wherein the means for axially moving said shaft and said conical piece is mechanical.

* * * * *